United States Patent [19]
Bury

[11] Patent Number: 5,247,749
[45] Date of Patent: Sep. 28, 1993

[54] MACHINE STRUCTURE

[75] Inventor: James Bury, Allestree, England

[73] Assignee: Cincinnati Milacron Inc., Cincinnati, Ohio

[21] Appl. No.: 576,509

[22] PCT Filed: Apr. 5, 1989

[86] PCT No.: PCT/GB89/00345

§ 371 Date: Oct. 5, 1990

§ 102(e) Date: Oct. 5, 1990

[87] PCT Pub. No.: WO89/09677

PCT Pub. Date: Oct. 19, 1989

[30] Foreign Application Priority Data

Apr. 8, 1988 [GB] United Kingdom ............... 8908280

[51] Int. Cl.⁵ .............................................. G01B 5/00
[52] U.S. Cl. ...................................... 33/503; 428/116
[58] Field of Search .......................... 428/116, 117; 52/DIG. 10; 33/503, 1 M

[56] References Cited

U.S. PATENT DOCUMENTS

| | | | |
|---|---|---|---|
| 2,756,032 | 7/1956 | Dowell | 428/188 X |
| 2,789,480 | 4/1957 | Wellauer | 428/188 X |
| 3,137,602 | 6/1964 | Lincoln | 428/116 X |
| 3,170,471 | 2/1965 | Schnitzer | 428/116 X |
| 3,204,667 | 9/1965 | Zahorski | 428/188 X |
| 3,221,464 | 12/1965 | Miller | 52/DIG. 10 |
| 3,645,833 | 2/1972 | Figge | 428/107 |
| 3,970,324 | 7/1976 | Howat | 428/117 X |
| 4,448,832 | 5/1984 | Kidwell | 52/DIG. 10 |
| 4,525,930 | 7/1985 | Bury | 33/572 X |
| 4,655,022 | 4/1987 | Natori | 52/DIG. 10 |
| 4,756,943 | 7/1988 | Koletzko | 428/116 |
| 5,063,683 | 11/1991 | Bury | 33/573 |
| 5,070,673 | 12/1991 | Weisse | 428/116 X |

FOREIGN PATENT DOCUMENTS 2095143 9/1982 United Kingdom ................ 428/188

OTHER PUBLICATIONS

Engineered Materials Handbook TM vol. 1 Composites, 1987, various pages.

Advanced Composites, 1990 Bluebook "Glossary", various pages.

*Primary Examiner*—Henry F. Epstein
*Attorney, Agent, or Firm*—Thomas M. Farrell; Ronald J. Snyder

[57] ABSTRACT

A lightweight structure for the base of a co-ordinate measuring machine is formed of a triangulated space frame arrangement using carbon fibre reinforced plastics bars (30) having a near zero coefficient of thermal expansion. The frame arrangement may be covered by a skin extending across one or more faces of the frame members to form a closed structure.

13 Claims, 5 Drawing Sheets

MACHINE STRUCTURE

This invention relates to apparatus for measuring the distribution in space of physical properties of a workpiece using a co-ordinate system (hereinafter referred to as a "measuring apparatus" for ease of description) and is particularly concerned with high accuracy measuring and checking apparatus.

According to the present invention there is provided a measuring apparatus as hereinbefore defined comprising at least in part a plurality of frame components which either have such inherent properties or are so interconnected as to define a rigid but relatively lightweight structure.

Preferably the frame components are interconnected in a triangulated space frame arrangement. Preferably also the frame components are constructed from a carbon fibre composite material.

Cover means may extend across the frame components and be connected thereto, and may comprise a single skin of material across one face of the frame components. A further single skin of material may extend wholly or partly across the opposed face of the frame components. In another arrangement, the cover means may be one or more panels, at least some of which may have a triangulated configuration and may be interconnected in a triangulated arrangement.

Further the frame components may comprise a plurality of interconnected panels, some of which may have a triangular configuration and be interconnected in a triangulated arrangement, whereby to define a rigid but relatively lightweight structure.

Preferably the panels are constructed from a carbon fibre composite material.

Preferably also at least some of the panels have an open cellular construction with skins extending across respective open faces of the cellular construction. The cellular construction may take the form of a honeycomb. Alternatively the panels may have an infill, for example of a foam plastic material.

BRIEF DESCRIPTION OF THE DRAWINGS

Embodiments of the present invention will now be described by way of example only with reference to the accompanying drawings, in which:

Referring to FIG. 1 of the drawings, a three-axis co-ordinate measuring machine comprises a base 10, and columns 12 supporting a bridge 14 and arranged for movement along the base 10 by means of guideways 16. The columns 12 have guideways 18 for lateral movement of a carriage 20, the latter mounting a probe which is vertically movable thereon and is adapted to contact the workpiece. Such a machine is conventional.

The base 10 may be formed as a lightweight structure, for example of steel or a granite composite as described in our co-pending U.K. Application No. 8808281 entitled "Support Structures", supported as described in our co-pending U.K. Application No. 8808282 entitled "Support Assemblies" now U.S. Pat. No. 5,063,683, and the linear guideways in the machine may comprise tubular guides as also described in our co-pending U.K. Application No. 8808279 entitled "Linear Guiding Apparatus".

A lightweight structure for the columns 12 and the bridge 14 may be formed by a plurality of frame members connected together in a triangulated space frame arrangement, with a cover or single skin extending across one face of the frame members to form a closed structure.

Figure 1:
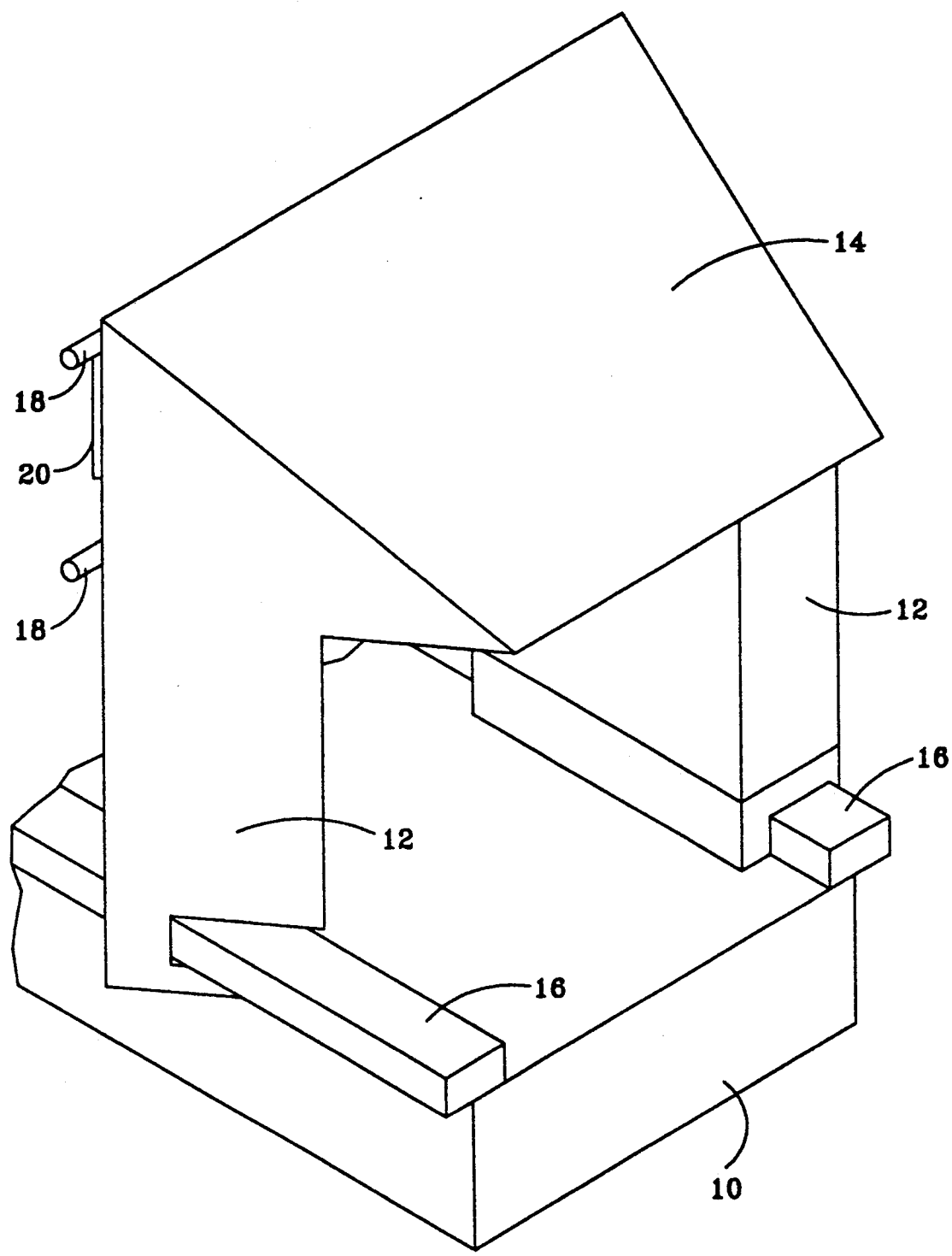
FIG. 1 is a schematic perspective view of part of a co-ordinate measuring apparatus.
Figure 2:
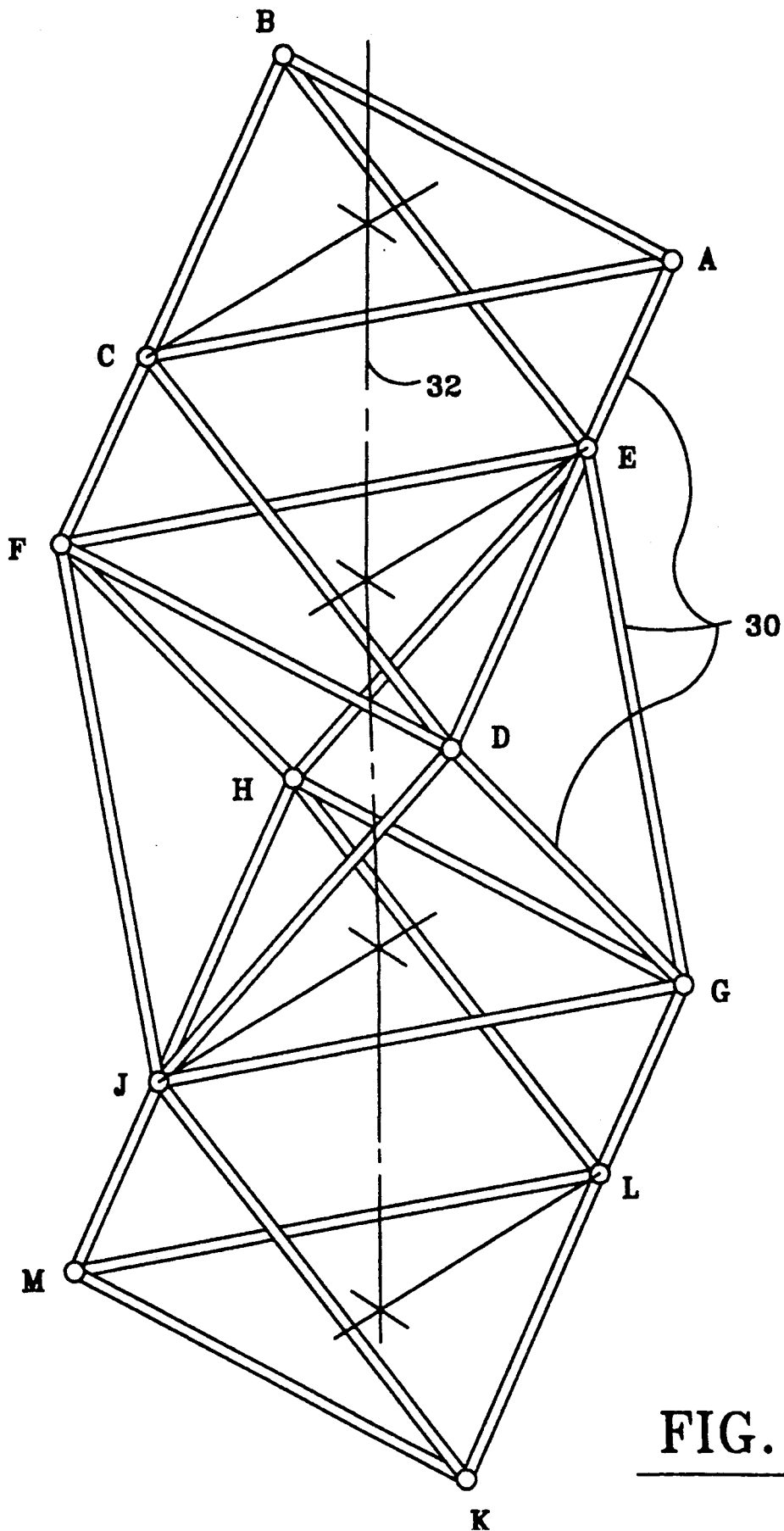
FIG. 2 shows schematically part of one embodiment of a structure for an apparatus according to the invention.

In a first embodiment of the lightweight structure, shown in FIG. 2, a fully triangulated space frame is formed of bars 30 which may be made, for example, from a carbon fibre reinforced plastic material. In such a material the carbon fibres may be uni-directional along the bars 30 or may contain circumferential or helical fibres. The bars 30 may be solid or hollow, or any cross-sectional, configuration, and may contain a core of another material. In FIG. 2 the apices of a first triangle in a plane normal to a longitudinal axis 32 of the structure are identified by A, B, C. Other such triangles in parallel planes are identified respectively by D, E, F; G, H, J; K, L, M. Each apex of one such identified triangle is joined to the adjacent identified triangle by two further bars 30.

Figure 3:
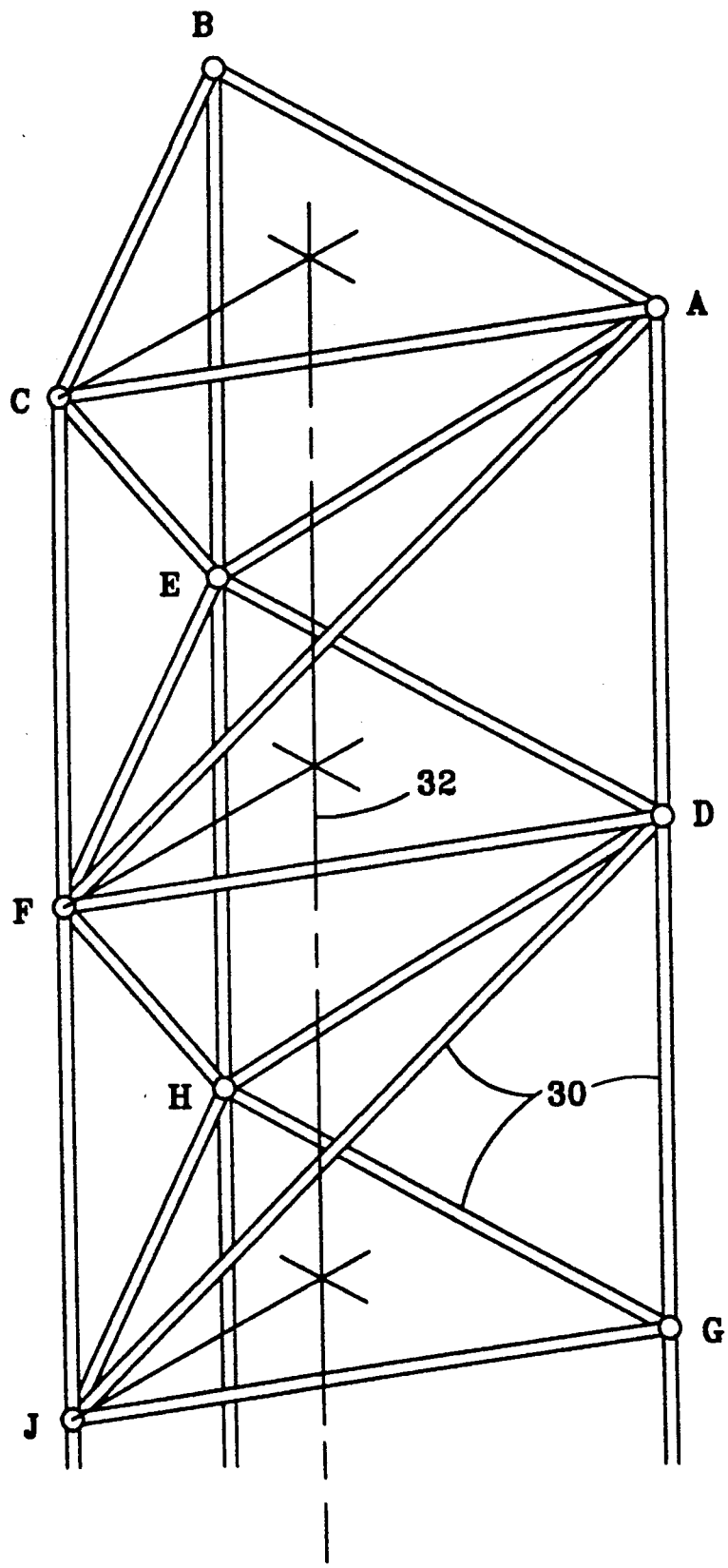
FIG. 3 shows schematically a further embodiment of a structure for an apparatus according to the invention.

The embodiment of FIG. 3 has a plurality of the bars 30 arranged in a different triangulated space frame. Again the apices of the triangles located in planes normal to the longitudinal axis 32 are identified respectively by A, B, C; D, E, F; and G, H, J. Each apex of such an identified triangle is joined to the apex of each adjacent identified triangle by a bar 30 parallel to the axis 32. Each face of the prism enclosed by the space frame thereby consists of a series of adjacent rectangles and each rectangle has one diagonal bar 30, provided to triangulate the structure.

Figure 4:
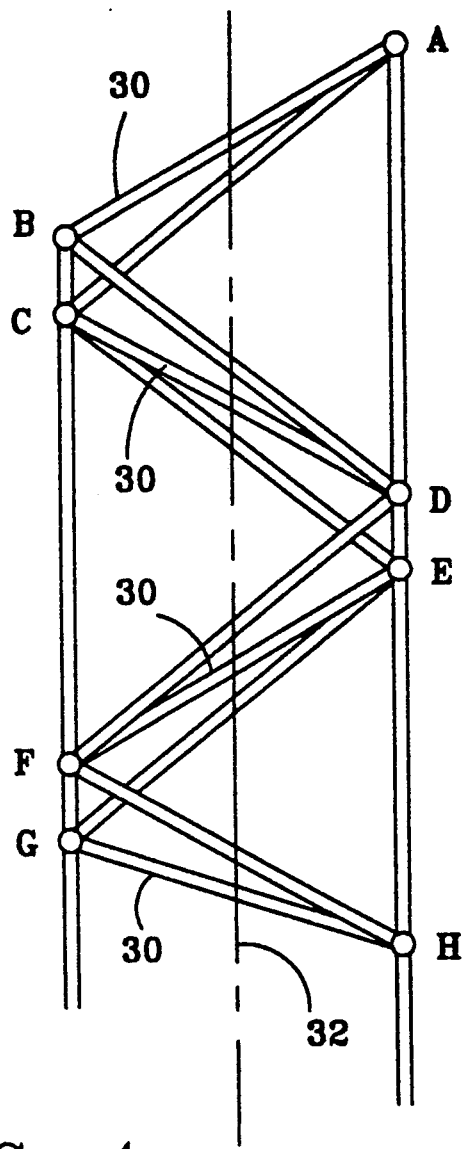
FIG. 4 shows schematically another embodiment of a structure for an apparatus according to the invention.

A triangulated space frame structure as shown in FIG. 4 has a plurality of the bars 30, forming linked tetrahedra. Those bars 30 identified as A, B; C, D; E, F; and G, H all lie in planes normal to the longitudinal axis 32 of the structure although at right angles to one another. Each end of each of the identified bars is connected to the respective ends of the adjacent identified bar, whereby for example A B C D forms a tetrahedron of six bars 30. C D E F forms a second tetrahedron with bar C D common to both tetrahedra, while a bar B F stabilises the two tetrahedra by forming a tetrehedron C D F. The tetrahedron A B C D is repeated as E F G H with a bar D H stabilising two tetrahedra by forming a tetrahedron D E F H. The structure can continue indefinitely in this manner.

The triangulated space frame arrangement provides an extremely stiff but lightweight structure and the frame members can be formed from material having a near zero coefficient of thermal expansion, for example the carbon fibre composite material.

In a modification a single skin may extend across the opposed face of the frame members or possibly only the joint areas to increase joint stiffness.

In a further embodiment a lightweight structure for the columns 12 and the bridge 14 may be formed of a plurality of interconnected panels 22 (see FIG. 5), each of which has a cellular construction in the form of a honeycomb 24 extending between double skins 26 located across the respective open faces of the honeycomb 24. Some of the panels 22 may be formed with a triangular configuration and be connected together in a triangulated arrangement. The panels are preferably connected by any suitable technique using adhesive, and/or mechanical fasteners, and effectively form a monocoque shell. Such a shell provides an extremely stiff but lightweight structure which can be formed of a material having a near zero coefficient of thermal expansion, for example carbon fibre. The use of a honeycomb provides for lack of shear between the two skins of the panel and the use of a double skinned panel prevents buckling under compression.

In the modification the panels 22 may be formed of a foam plastic material between the double skins, or any other lightweight structural material which will transmit shear forces between the skins.

With either type of panel a carbon fibre composite material may be utilised for construction.

Figure 5:
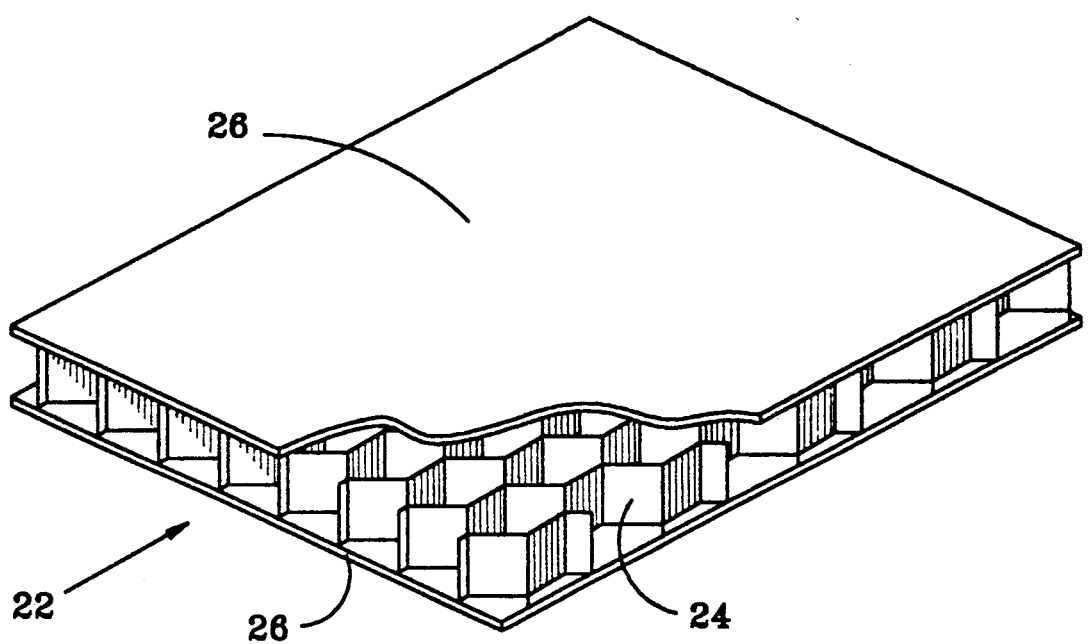
FIG. 5 is a persepctive view of a panel of a further embodiment of the structure, with part removed to view internally.

In a third embodiment, a lightweight structure for the columns 12 and the bridge 14 is formed of a plurality of frame members at least some of which are connected together in a triangulated space frame arrangement as described in relation to any of the embodiments of FIGS. 2 to 4. Panels of the type described with reference to FIG. 5 are then connected across the frame members to form a closed structure.

Various modifications may be made without departing from the invention. For example the invention is obviously not restricted to the design of measuring machine described and shown or indeed to use with measuring machines. Also the cellular structure of the panels may take form of other than a honeycomb.

I claim:

1. An improved probe support apparatus for a coordinate measuring machine having a base, a bridge movably mounted on the base relative to an object to be measured, and a measuring probe supported on the bridge for movement relative to the object, said support apparatus comprising:
   a lightweight, rigid three-dimensional triangulated space frame forming a part of the bridge, said space frame comprising a plurality of rigid bars connected adjacent their ends, each of said bars being continuous between its respective pair of opposite end connections, and each end of each bar connected to the respective end of adjacent bars in a triangulated arrangement;
   first guideway means for movably guiding and supporting said space frame on the base; and
   second guideway means for guiding and supporting the measuring probe on said space frame.

2. The apparatus of claim 1, further comprising means for covering an open face of said space frame defined by interconnected bars, said covering means being securely affixed to a plurality of said bars.

3. An apparatus according to claim 2, wherein the covering means comprises a single skin of material across one open face of said space frame.

4. An apparatus according to claim 2, wherein the covering means comprises one or more panels.

5. An apparatus according to claim 4, wherein at least some of the panels have an open cellular construction in the form of a honeycomb, with skins extending across respective open faces of the cellular construction.

6. An apparatus according to claim 4, wherein said panels comprise a cellular construction having the form of a honeycomb.

7. An apparatus according to claim 4, wherein at least some of said panels comprise an open cellular construction in the form of a honeycomb, with skins extending across respective open faces of the cellular construction.

8. An apparatus according to claim 4, wherein at least some of said panels comprise a pair of skins and an infill of structural material therebetween to transmit shear forces between said skins.

9. An apparatus according to claim 8, wherein the structural material comprises a foamed plastic.

10. An apparatus according to claim 4, wherein at least some of said panels comprise carbon fibre composite material.

11. The apparatus of claim 1, wherein said bars are made from a reinforced composite material which includes a plastic material having reinforcing fibers embedded therein.

12. The apparatus of claim 11, further comprising means for covering an open face of said space frame, said covering means being affixed to a plurality of said bars and comprising composite material.

13. In combination, an improved probe support apparatus for a co-ordinate measuring machine having a base, a bridge movably mounted on the base relative to an object to be measured, and a measuring probe supported on the bridge for movement relative to the object, said support apparatus characterized by comprising:
    a lightweight, rigid three-dimensional triangulated space frame forming a part of the bridge, said space frame comprising a plurality of rigid bars connected adjacent their ends, each of said bars being continuous between its respective pair of opposite end connections, and each end of each bar connected to the respective end of adjacent bars in a triangulated arrangement;
    first guideway means for movably guiding and supporting said space frame on the base; and
    second guideway means for guiding and supporting the measuring probe on said space frame.

* * * * *